No. 875,319. PATENTED DEC. 31, 1907.
B. BURGESS.
AUXILIARY DRAW-BAR HOOK.
APPLICATION FILED MAR. 22, 1907.

Benjamin Burgess Inventor
by his Atty's

Attest:
F. E. Alexander
J. Alexander Vernon

UNITED STATES PATENT OFFICE.

BENJAMIN BURGESS, OF DANVILLE, ILLINOIS.

AUXILIARY DRAW-BAR HOOK.

No. 875,319.

Specification of Letters Patent.

Patented Dec. 31, 1907.

Application filed March 22, 1907. Serial No. 363,833.

*To all whom it may concern:*

Be it known that I, BENJAMIN BURGESS, a citizen of the United States, residing at Danville, county of Vermilion, and State of Illinois, have invented certain new and useful Improvements in Auxiliary Draw-Bar Hooks, of which the following is a specification.

My invention relates to appliances for the convenient attachment of cables, chains and other like means to the draw bars of locomotives or wrecking cars, and more particularly it relates to a hook adapted for easy attachment to the ordinary form of car coupler used on practically all railroads, known as the Janney coupler, or to other self-couplers.

The object of the invention is to provide such a hook that shall be of extreme simplicity, quickly attachable or detachable, which shall be adapted to the ordinary coupler without change in the latter, and which shall distribute the hauling strain more equally to the draw bar, and which in the best form of my device will be of particularly strong construction.

My invention consists in the construction shown in the accompanying drawings, and more particularly set forth in the claims appended to this specification.

Figure 1:
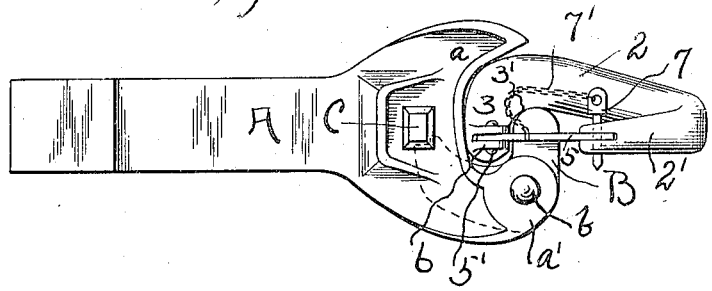
Figure 2:
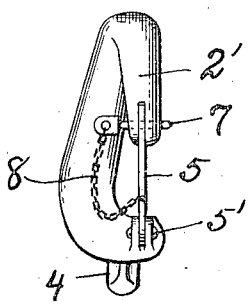
Figure 3:
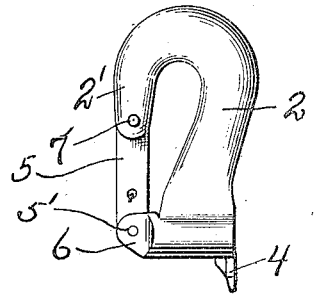
Figure 4:
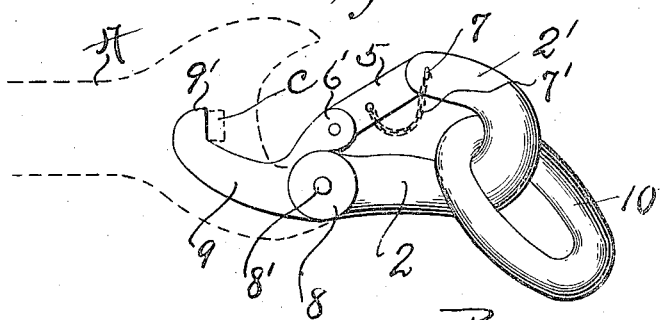

In the drawings, Figure 1 shows a top view of the ordinary railroad draw bar and coupler, one form of my wrecking hook being placed in position. Fig. 2 is a top view of the hook shown in Fig. 1, detached. Fig 3 is a side view of Fig. 2. Fig. 4 is a top view of a modified form of hook, the drawbar being shown in dotted lines.

Like characters represent like parts.

A designates the draw bar of the ordinary Janney type having a recessed head a. One side of this recessed head is bifurcated and between the arms of this bifurcation is pivoted the knuckle B. One arm of this knuckle normally extends partly across the opening of the coupler and the other extends rearward and inward and normally bears against a pin C inserted through the coupler head. The pivot pin b of the knuckle B is of course removable. This description applies to the ordinary form of coupler in use on most of the railroads of this country.

2 designates the shank of my wrecking hook, one end of which is bent vertically upward and rearward as at 2' to form the hook portion proper and the other being extended rearward and then turned to one side as at 3 forming an enlarged and laterally bent head as shown in Fig. 2 to engage behind the rear face of the knuckle B, when the latter is in the position shown in Fig. 1.

Preferably the shank 2 of the hook is laterally inclined so that at its end where it joins the hook portion proper 2' it is on a line with the end of the laterally extended portion 3. Thus any strain brought upon the hook 2' is transmitted through the axial line of the draw-bar. The laterally projecting head is slightly cut away as at 3' at its juncture with the shank of the hook to form a slightly curved recess adapted to fit snugly against the inside surface of the knuckle B.

It will be understood that the head 3 is thicker than the shank 2 and is approximately of the same depth as the knuckle B. On its rear face the head is provided with the projecting lug 4 adapted to engage with the opening of the coupler to retain the hook in place against any sidewise draft and to prevent the displacement of the hook below the knuckle.

Removably attached at one end to the termination of the hook portion 2' and to the body of the shank is the tie-bar 5. This is preferably pivoted at one end as at 5' in a slotted lug 6 projecting from and formed with the head 3 on the same side as the opening of the hook. The end of the hook portion 2' is also slotted for the reception of the free end of this tie-bar. A removable pin 7 passes through the slotted end of the hook and the tie-bar. In order that this pin 7 may not be lost I attach it to the tie bar by a chain 7'. It is of course obvious that I may transpose the pivot point of the tie bar to the end of the hook instead of forming it with the base.

One of the main advantages of the tie-bar as applied to wrecking hooks is that such a hook is much stronger than an open hook. There is no danger of the hook portion 2' breaking off or bending open as it is practically a closed link when the tie bar is in place and the hook closed. Another advantage is that a ring or chain link may be slipped over the hook and permanently kept thereon as shown in Fig. 4. This ring may be easily slipped backward to the base of the hook when the hook alone is to be used. In addition to this, when a closed hook is used and the draft chain or cable breaks, the end of the chain or ring is retained. With the open ring it is very liable to be broken off at the snapping of the tackle and either lost or flung off with a force sufficient to endanger the lives of the spectators. In using this form of hook the pin C on the draw bar head is removed, the knuckle opened, the projecting lug 4 inserted into the opening of the coupler, the knuckle closed, and the pin C replaced. This prevents the opening of the knuckle and as will be seen draft upon the hook acts upon the knuckle in precisely the same manner as if it were engaged by the knuckle of an adjacent coupler. The lug 4 might be eliminated and in that case the hook is adapted to be simply dropped into place behind the closed knuckle and draw bar and in removing it it is only necessary to lift it up. It will be noted that the tie bar when closed rests upon the knuckle, thus acting to support the hook when the longitudinal strain upon it is relieved and preventing the dropping of the hook out of engagement with the coupler head.

In Fig. 4 I show a modification of my device. In this the hook portion 2' is so made with relation to the attachment that when in place the hook lies in a horizontal plane instead of the vertical plane as in the hooks before described. In the other form of hooks this was not necessary as the shank of the hook projected outward from the center of the draw-bar, but the form shown in Fig. 4 being attached to the coupling at its sides requires that the hook should be turned inward. At its base the shank 2 of the hook is enlarged to form a circular head 8, adapted to fit between the bifurcated jaws a' of the coupling in which is usually pivoted the knuckle B. The head is formed with a passage 8' to receive the knuckle pivot-pin b. Rearward, the shank is extended as at 9 and at its end it engages with the coupling pin C in the same manner as the knuckle B engages. Thus any pull upon the hook is transmitted to the pivot pin 8' and also a sidewise thrust to the pin C. Preferably I provide the end of this extension with a lateral projection 9' adapted to engage against the rear face of the coupling pin C. Thus any forward pull on the hook is borne both by the pivot pin 6 and also directly by the coupling pin C. Thus the strain on the hook acts on both pins and not merely on the pivot pin. While this form of hook may be opened if desired, I preferably provide it with the latch bar 5; the base of the shank 2 of the hook being provided with the projecting lugs 6' similar to the lugs 6 on the form shown in Fig. 3. One end of the tie- or latch-bar 5 is pivoted in the lugs 6' and the other is received in the bifurcated end of the hook 2'. A pin 7 passes through the hook and tie-bar to hold the bar closed. A chain 7' attaches the pin to the tie-bar or any other suitable portion of the hook so that it need not be lost. 10 designates a link which may be permanently placed on the hook and which, as before described, may be moved out of the way when it is desired to use the hook alone.

This device is peculiarly designed for attaching chains or cables to wrecking cars of locomotives for the purpose of pulling wreckage apart, dragging derailed cars again upon the track, or drawing cars on adjacent tracks.

Having described my invention what I claim is:

1. A detachable hook for draw bars comprising a shank, having a re-curved end forming a hook, the other end of said shank having a head adapted to engage with a coupling head, and a tie-bar pivoted at one end to the said shank and at the other end engaging with the termination of the recurved portion.

2. A detachable hook for draw bars comprising a shank having a re-curved end with a slotted termination, a head on the other end of said shank adapted to have engagement with the coupling, lugs projecting from the shank, and a tie-bar pivoted between the lugs and adapted to be received within the slotted termination of the said re-curved portion, and means for holding the said tie-bar in place.

3. A detachable hook for draw bars comprising a shank having a re-curved end, the other end of said shank having a head adapted to be received within the slot of the laterally projecting knuckle-carrying jaw of a coupling head and pierced for the passage of the pivot pin of said knuckle, said shank being extended rearward to enter the opening of the coupler head and to engage with the coupling pin of said coupling head.

4. A detachable hook for draw bars comprising a shank having a re-curved end, the other end of said shank having a head adapted to be received within the slot of the laterally projecting knuckle-carrying jaw of a coupling head, and pierced for the passage of the pivot pin of said knuckle, said shank being extended rearward to enter the opening of the coupling head, and then bent laterally to engage the rear of the coupling pin of said coupler head.

In testimony whereof, I have signed my name to this specification in the presence of two subscribing witnesses, this 18th day of March 1907.

BENJAMIN BURGESS.

Witnesses:
HELEN BURGESS,
GRACE M. BURGESS.